US012657651B2

(12) United States Patent
Pinhasov

(10) Patent No.: US 12,657,651 B2
(45) Date of Patent: Jun. 16, 2026

(54) VIDEO CAPTURE PROCESSING AND EFFECTS

(71) Applicant: QUALCOMM Incorporated, San Diego, CA (US)

(72) Inventor: Eran Pinhasov, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 18/523,223

(22) Filed: Nov. 29, 2023

(65) Prior Publication Data

US 2025/0173815 A1 May 29, 2025

(51) Int. Cl.
| | |
|---|---|
| *G06T 3/18* | (2024.01) |
| *G06T 7/246* | (2017.01) |
| *G06T 7/50* | (2017.01) |
| *G06T 7/73* | (2017.01) |
| *H04N 23/80* | (2023.01) |

(52) U.S. Cl.
CPC ............... *G06T 3/18* (2024.01); *G06T 7/248* (2017.01); *G06T 7/50* (2017.01); *G06T 7/74* (2017.01); *H04N 23/80* (2023.01); *G06T 2207/30241* (2013.01); *G06T 2207/30244* (2013.01)

(58) Field of Classification Search
CPC .. G06T 3/18; G06T 7/248; G06T 7/50; G06T 7/74; G06T 2207/30241; G06T 2207/30244; G06T 7/30; G06T 2207/10016; G06T 7/20; H04N 23/80
See application file for complete search history.

(56) References Cited

U.S. PATENT DOCUMENTS

| | | | |
|---|---|---|---|
| 9,667,873 B2 * | 5/2017 | Mulloni | G01C 25/005 |
| 2021/0142443 A1 * | 5/2021 | Eble | G06T 3/40 |
| 2023/0252599 A1 * | 8/2023 | Chtcherbatchenko | G06T 7/33 |
| | | | 382/103 |

OTHER PUBLICATIONS

International Search Report and Written Opinion—PCT/US2024/056553—ISA/EPO—Feb. 27, 2025.
Liu F., et al., "Content-Preserving Warps for 3D Video Stabilization", ACM Transactions on Graphics (Proceedings of SIGGRAPH 2009), Jul. 27, 2009, ACM, NY, US, vol. 28, No. 3, pp. 1-9, XP059141874, The whole document.

* cited by examiner

*Primary Examiner* — Christopher K Peterson
(74) *Attorney, Agent, or Firm* — QUALCOMM Incorporated

(57) ABSTRACT

Systems and techniques are described for image capturing. For instance a process can include receiving an indication of a planned trajectory through an environment from a first position towards a second position; determining a location of an image capture device in the environment; obtaining an image from the image capture device at a third position; and transforming the image based on a difference between the third position and a corresponding position in the planned trajectory.

30 Claims, 13 Drawing Sheets

300

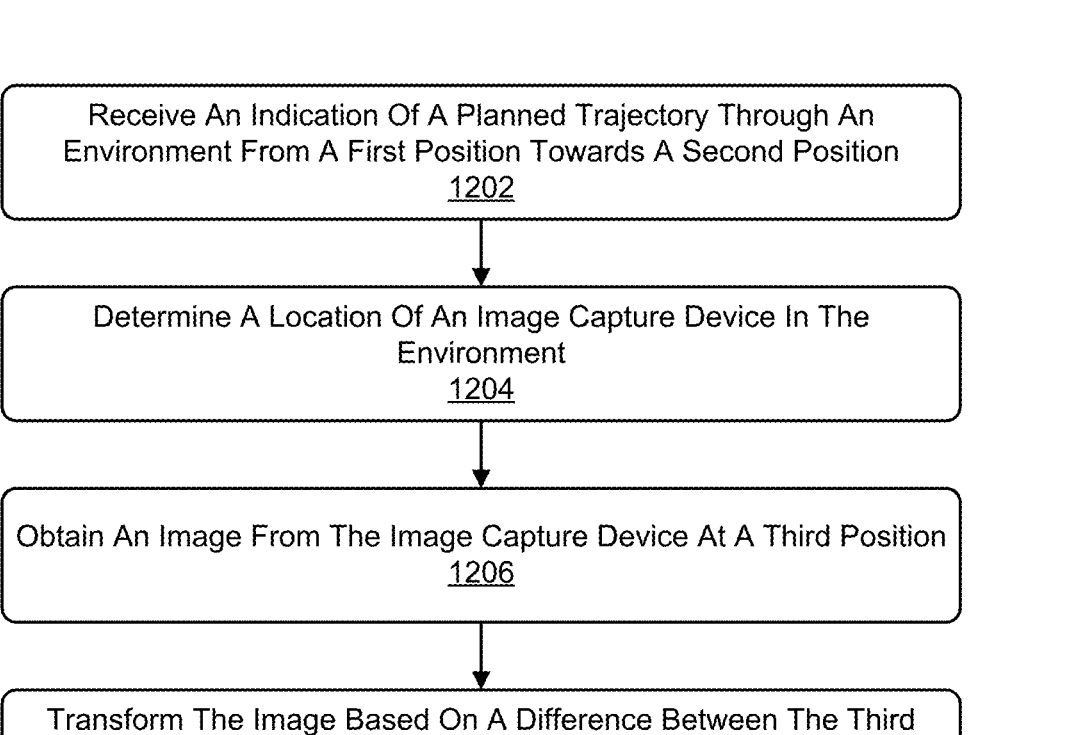

1200

Receive An Indication Of A Planned Trajectory Through An
Environment From A First Position Towards A Second Position
1202

Determine A Location Of An Image Capture Device In The
Environment
1204

Obtain An Image From The Image Capture Device At A Third Position
1206

Transform The Image Based On A Difference Between The Third
Position And A Corresponding Position In The Planned Trajectory
1208

FIG. 12

VIDEO CAPTURE PROCESSING AND EFFECTS

FIELD

The present application is generally related to capturing and processing images. For example, aspects of the application relate to an image capturing and processing device configured to perform video capture processing and provide various effects based on the video capture processing (e.g., to act as a virtual dolly camera).

BACKGROUND

A camera is a device that receives light and captures image frames, such as still images or video frames, using an image sensor. Cameras may include one or more processors, such as image signal processors (ISPs), that can process one or more image frames captured by an image sensor. For example, a raw image frame captured by an image sensor can be processed by an image signal processor (ISP) to generate a final image. Cameras can be configured with a variety of image capture and image processing settings to alter the appearance of an image. However, altering the appearance of an image can only change what has been already captured. In some cases, it may be useful to have techniques to help improve content that is captured by cameras.

BRIEF SUMMARY

In some examples, systems and techniques are described for improved imaging capturing. For example, aspects of the present disclosure relate to systems and techniques for performing video capture processing and providing various effects based on the video capture processing (e.g., to act as a virtual dolly camera which may be used to capture images).

In one illustrative example, an imaging apparatus is provided. The imaging apparatus includes at least one memory and at least one processor coupled to the at least one memory. The at least one processor is configured to: receive an indication of a planned trajectory through an environment from a first position towards a second position; determine a location of an image capture device in the environment; obtain an image from the image capture device at a third position; and transform the image based on a difference between the third position and a corresponding position in the planned trajectory.

As another example, a method for capturing images is provided. The method includes: receiving an indication of a planned trajectory through an environment from a first position towards a second position; determining a location of an image capture device in the environment; obtaining an image from the image capture device at a third position; and transforming the image based on a difference between the third position and a corresponding position in the planned trajectory.

In another example, a non-transitory computer-readable medium is provided. The non-transitory computer-readable medium has stored thereon instructions that, when executed by at least one processor, cause the at least one processor to: receive an indication of a planned trajectory through an environment from a first position towards a second position; determine a location of an image capture device in the environment; obtain an image from the image capture device at a third position; and transform the image based on a difference between the third position and a corresponding position in the planned trajectory.

As another example, an apparatus for capturing images is provided. The apparatus includes means for receiving an indication of a planned trajectory through an environment from a first position towards a second position; means for determining a location of an image capture device in the environment; means for obtaining an image from the image capture device at a third position; and means for transforming the image based on a difference between the third position and a corresponding position in the planned trajectory.

In some aspects, one or more of the apparatuses described herein is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 12 is a flow diagram illustrating a process for capturing images, in accordance with aspects of the present disclosure;

DETAILED DESCRIPTION

Figure 1:
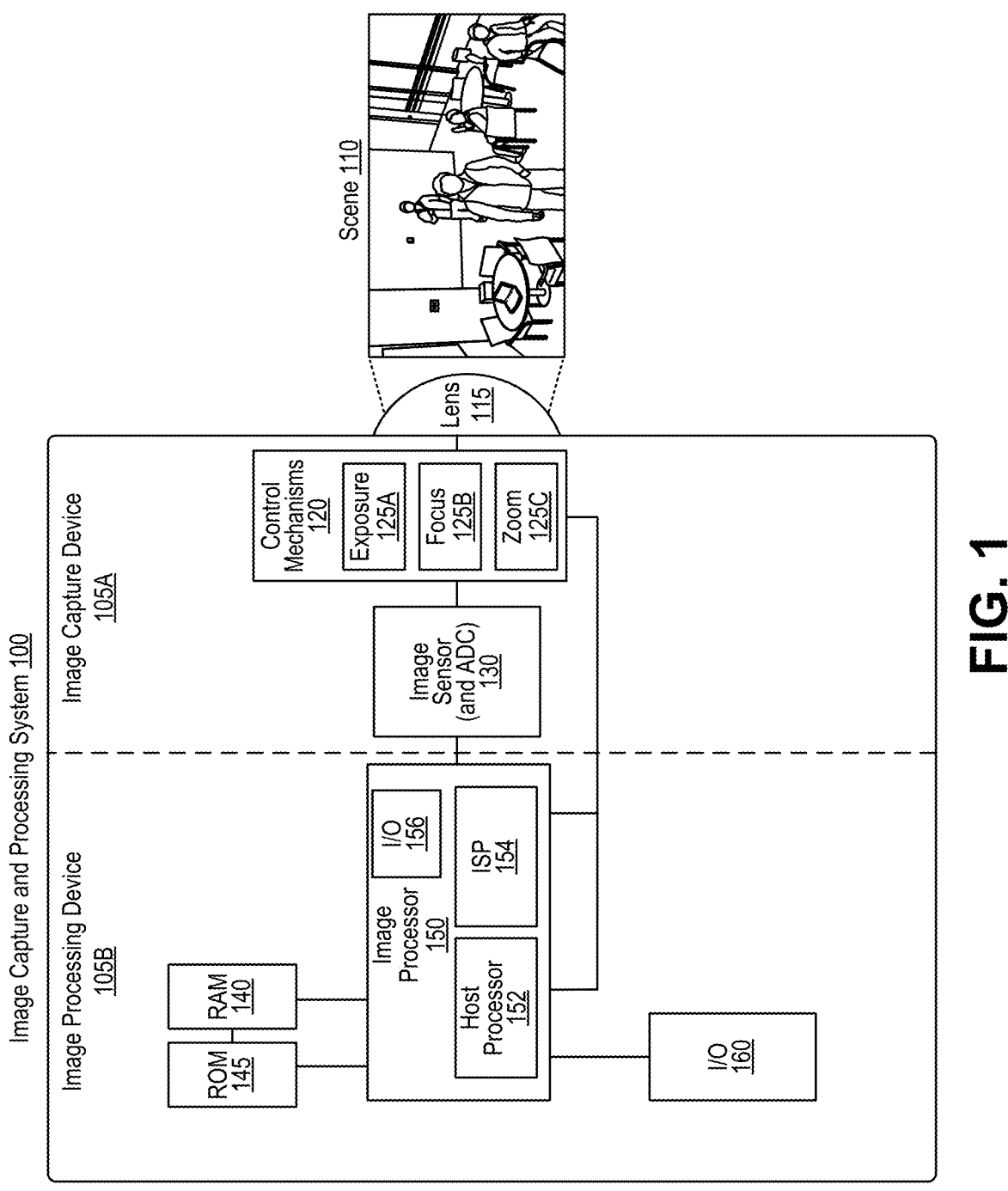
FIG. 1 is a block diagram illustrating an architecture of an image capture and processing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Image capture devices, such as cameras, can be configured with a variety of image capture and image processing settings that help improve the appearance of captured images. Some settings can be configured for post-processing of images, such as alterations to a contrast, brightness, saturation, sharpness, levels, curves, and colors, among others. Additionally, some imaging device settings can be determined and applied before or while an image is captured, such as ISO, exposure time (also referred to as exposure duration), aperture size, f/stop, shutter speed, focus, and gain, among others.

However, image capture and image processing settings may be limited by how the imaging device is handled to obtain images to be processed. In some cases, camera movements, such as panning, tilting, tracking, pedestal shots, etc., may be used to enhance the images being captured. The motion of the camera in such shots may be used to enhance the story being told, increase tension, involve the viewer, invoke and/or enhance emotion, and the like. However, it can be difficult to capture a smooth and consistent moving camera shot along a predefined path using a hand-held device due to the difficulty of moving one's hands smoothly and consistently. For example, a hand-held camera may experience speed, location, and angle jitter while attempting to capture moving camera shots.

In some cases, a mechanical gimbal or other digital and/or analog stabilization mechanisms may be used, but such mechanisms generally attempt to cancel user handshake (e.g., of a person holding the imaging device), but these mechanisms generally attempt to follow (e.g., adjust for) a user motion direction to smooth out the motion, even though the user's motion may not be smooth or consistent. However, such mechanisms may just smooth such motions, but such mechanisms do not attempt to align images with a defined path, such as if the imaging device were mounted on a track, vehicle (e.g., a dolly), moveable/rotatable axis, etc., and moving along the defined path.

Systems, apparatuses, processes (also referred to as methods), and computer-readable media (collectively referred to as "systems and techniques") are described for performing video capture processing and providing various effects based on the video capture processing (e.g., to act as a virtual dolly camera for acquiring images). Having a camera moving along a predefined path in an environment can allow for smoother and more consistent camera images to be captured. For the virtual dolly camera, a planned trajectory defining how a camera should be moved through the environment may be determined. For example, a device including a camera (e.g., a mobile device) may present a set of pattern trajectories, for example on a display of the device. The device may receive an indication of a intended trajectory to use, such as based on user input from a user of the device selecting a pattern trajectory from the set of pattern trajectories. The camera may also determine its position in the environment. In some cases, the position of the camera in the environment may be determined using assisted visual odometry and an internal measurement unit (IMU) or 6 DOF positioning methods.

For clarity, an intended trajectory refers to a trajectory (e.g., information about a trajectory or path) indicated, for example, by a user. In some cases, the intended trajectory may be based on a selection of a pattern trajectory from a set of pattern trajectories. Pattern trajectories may be a set of commonly used trajectories (e.g., shots) for capturing images. In other cases, the intended trajectory may be indicated by a movement of the camera (e.g., image capturing device) through the environment. Based on the intended trajectory, a planned trajectory may be determined, for example, by adapting the intended trajectory to the environment/object, smoothing the intended trajectory, etc.

After an indication of the intended trajectory is received, the camera may determine a planned trajectory through the environment that corresponds to the intended trajectory. For instance, the planned trajectory may be a trajectory (or path) that the camera should be moved to capture images. In some cases, the planned trajectory may include threshold distances from which the camera may be moved/rotated/turned/tilted/etc. before adjustments to the images captured may be applied.

The planned trajectory may be relative to the position of the camera. For example, the planned trajectory may begin based on a current location of the camera. In some cases, the planned trajectory may be adjusted based on the environment. As an example, the intended trajectory may be selected based on an object. For example, the selected intended trajectory may be an arc or circle around an object. In some cases, the planned trajectory may be adjusted for a distance from/to an object or the environment. In some examples, a distance to the object may be determined, for example, to determine a path around/about the object and this distance and/or size of the object may be used to adjust the size/scale of the selected intended trajectory to form the planned trajectory. In some cases, an indication of a speed of the intended trajectory may also be received (e.g., implicitly or explicitly). This indicated speed may be incorporated into the determined planned trajectory. The determined planned trajectory may be output for presentation. For example, the camera may display a preview image of the planned trajectory overlayed on the environment indicating what the camera may capture if image capturing is started. The determined planned trajectory may be displayed on the preview image (e.g., overlaying the preview image of the environment). In some cases, the preview image may continue to be displayed while images are being capture by the camera.

In some cases, an indication to begin capturing images may then be received and the camera may begin capturing images. As indicated above, the planned trajectory of the camera may include an expected position (e.g., translation and rotation) for certain times (e.g., based on a received speed for the shot path) for the camera along the camera path. While image capturing is occurring, the camera may continue to monitor its movement through the environment, for example, based on information from the assisted visual odometry and IMU or 6 DOF positioning system, to determine an actual position/pose of the camera in the environment. This actual position/pose of the camera as it was moved through the environment while capturing images may define an actual trajectory. The camera may compare the expected position, as indicated in the planned trajectory against an actual position/pose.

In some cases, the camera may update a displayed on the preview image to indicate a difference between the expected position and the actual position. For example, a user interface (UI) element indicating the difference between the expected position and the actual position may be displayed on (e.g., overlayed on) the preview image. The indication between the expected position and actual position may be useful to help a user move the camera along the planned trajectory more accurately. Additionally, as images are taken along the actual trajectory, the location of the camera when the images are capture may be associated with the images. In some cases, the difference between the expected position and actual position may also be associated with the images. The camera may then adjust (e.g., warp, reproject, etc.) the images to align the captured images along with the planned trajectory. For example, the camera may warp images so that they appear to have been captured with the camera moving on the planned trajectory.

Various aspects of the techniques described herein will be discussed below with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. In some cases, the lens 115 and image sensor 130 can be associated with an optical axis. In one illustrative example, the photosensitive area of the image sensor 130 (e.g., the photodiodes) and the lens 115 can both be centered on the optical axis. The lens 115 bends incoming light from the scene 110 toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms

120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., RGB or other color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked).

In some cases, the image sensor 130 may alternately or additionally include opaque and/or reflective masks that block light from reaching certain photodiodes, or portions of certain photodiodes, at certain times and/or from certain angles. In some cases, the opaque and/or reflective masks may be used for phase detection autofocus (PDAF). In some cases, opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output by the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 13:
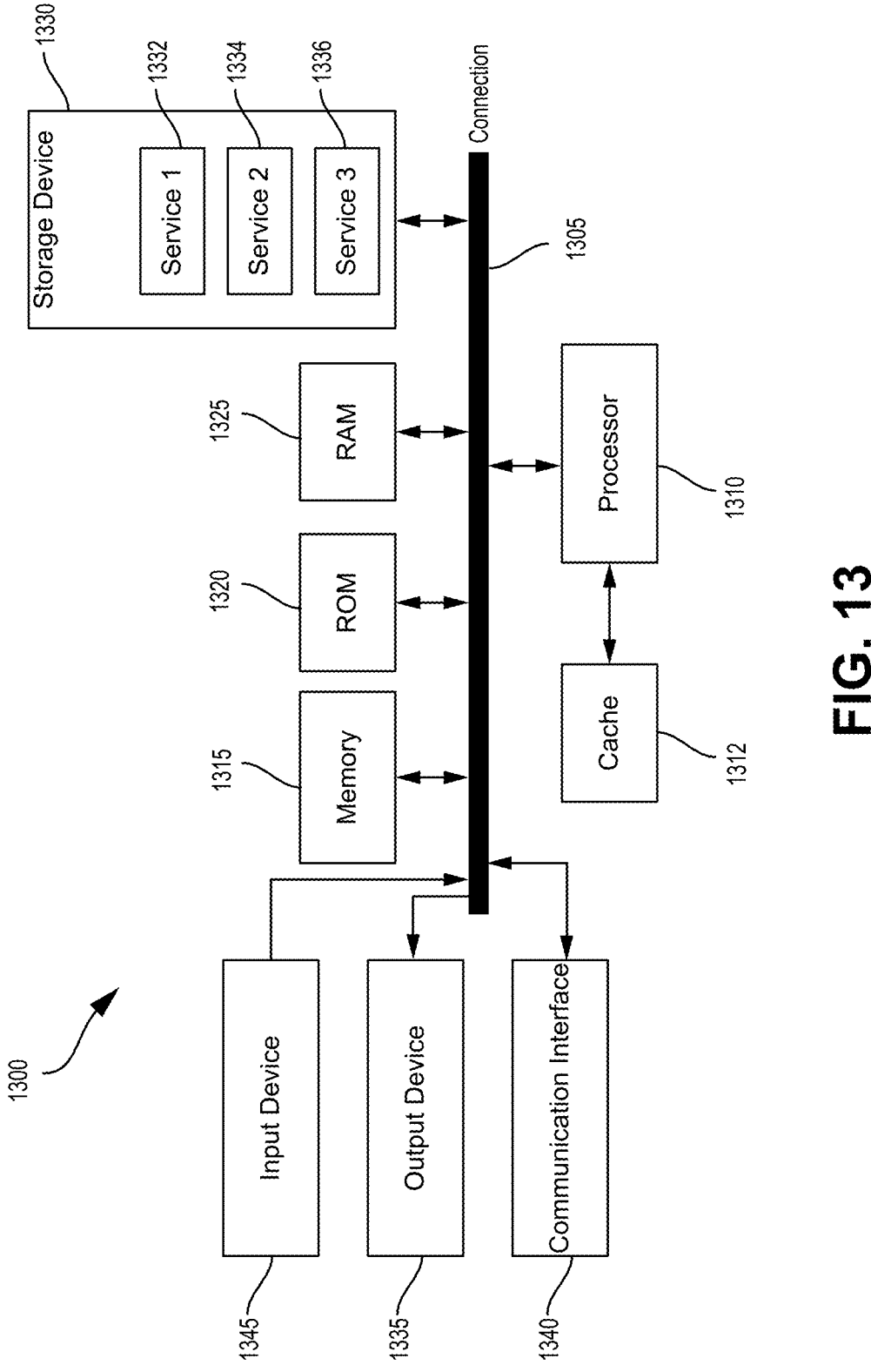
FIG. 13 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1310 discussed with respect to the computing system 1300 of FIG. 13. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/825, read-only memory (ROM) 145/820, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1335, any other input devices 1345, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system

100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

Figure 2:
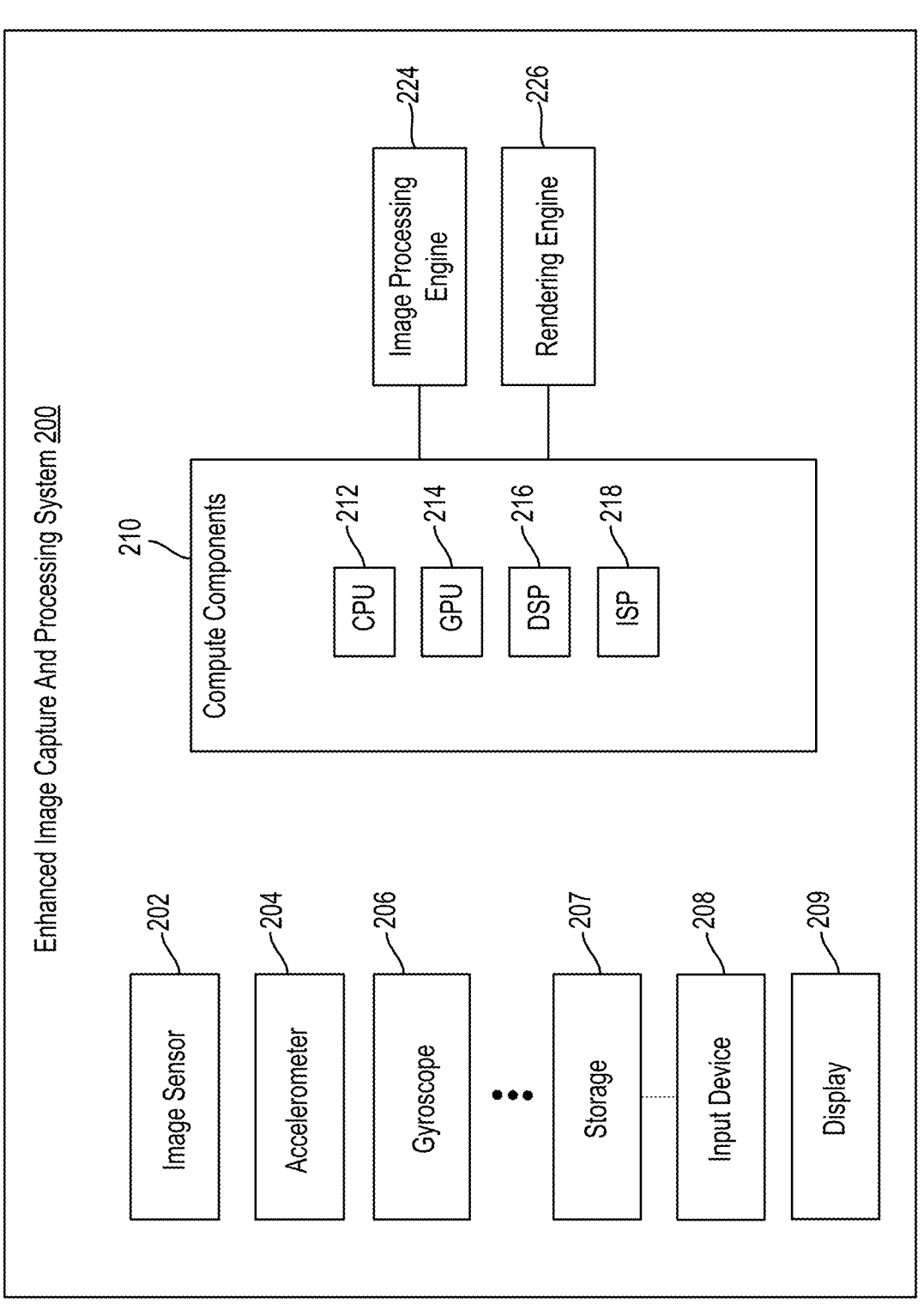
FIG. 2 is a diagram illustrating an architecture of an example enhanced image capture and processing system configured with a virtual dolly camera, in accordance with some aspects of the disclosure.

FIG. 2 is a diagram illustrating an architecture of an example enhanced image capture and processing system 200 configured with a virtual dolly camera, in accordance with some aspects of the disclosure. In some examples, the system 200 of FIG. 2 can include the image capture and processing system 100, the image capture device 105A, the image processing device 105B, or a combination thereof. In some examples, the system 200 can perform tracking, localization, and/or mapping of an environment in the physical world (e.g., a scene) as part of capturing and processing images. For example, the system 200 can track a pose (e.g., location and position) of the system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows virtual content to be overlaid, overlapped, blended with, or otherwise displayed thereon.

In this illustrative example, the system 200 includes one or more image sensors 202, an accelerometer 204, a gyroscope 206, storage 207, compute components 210, an image processing engine 224, and a rendering engine 226. It should be noted that the components 202-226 shown in FIG. 2 are non-limiting examples provided for illustrative and explanation purposes, and other examples can include more, fewer, or different components than those shown in FIG. 2. For example, in some cases, the system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one or more other processing engines, one or more other hardware components, and/or one or more other software and/or hardware components that are not shown in FIG. 2. While various components of the system 200, such as the image sensor 202, may be referenced in the singular form herein, it should be understood that the system 200 may include multiple of any component discussed herein (e.g., multiple image sensors 202).

The system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

In some implementations, the one or more image sensors 202, the accelerometer 204, the gyroscope 206, storage 207, compute components 210, image processing engine 224, and rendering engine 226 can be part of the same computing device. For example, in some cases, the one or more image sensors 202, the accelerometer 204, the gyroscope 206, storage 207, compute components 210, image processing engine 224, and rendering engine 226 can be integrated into a head mounted display (HMD), extended reality glasses, smartphone, laptop, tablet computer, gaming system, and/or any other computing device. However, in some implementations, the one or more image sensors 202, the accelerometer 204, the gyroscope 206, storage 207, compute components 210, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, application data, face recognition data, occlusion data, etc.), data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the image processing engine 224 and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, multiple image sensors 202 may be used to capture images from multiple positions and depth information determined based on differences between the images captured from the multiple positions (e.g., based on parallax information). As another example, in some implementations, the image sensor 202 (and/or other camera) can include an RGB-depth (RGB-D) camera. In some cases, the system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene.

Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the system 200 and can generate acceleration measurements based on the detected acceleration. In some cases, the accelerometer 204 can provide one or more translational vectors (e.g., up/down, left/right, forward/back) that can be used for determining a position or pose of the system 200. The gyroscope 206 can detect and measure the orientation and angular velocity of the system 200. For example, the gyroscope 206 can be used to measure the pitch, roll, and yaw of the system 200. In some cases, the gyroscope 206 can provide one or more rotational vectors (e.g., pitch, yaw, roll). In some examples, the image sensor 202, image processing engine 224, and/or rendering engine 226 can use measurements obtained by the accelerometer 204 (e.g., one or more translational vectors) and/or the gyroscope 206 (e.g., one or more rotational vectors) to calculate the pose of the system 200. As previously noted, in other examples, the system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the system 200, using a combination of one or more accelerometers, one or more gyroscopes, and/or one or more magnetometers. In some examples, the one or more sensors can output measured information associated with the capture of an image captured by the image sensor 202 (and/or other camera of the system 200) and/or depth information obtained using one or more depth sensors of the system 200.

The output of one or more sensors (e.g., the accelerometer 204, the gyroscope 206, one or more IMUs, and/or other sensors) can be used by the image processing engine 224 and/or rendering engine 226 to determine a pose of the system 200 and/or the pose of the image sensor 202 (or other camera of the system 200). In some cases, the pose of the system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6 DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3 DoF), which refers to the three angular components (e.g. roll, pitch, and yaw).

In some cases, a device tracker (not shown) can use the measurements from the one or more sensors and image data from the image sensor 202 to track a pose (e.g., a 6 DoF pose) of the system 200. For example, the device tracker can fuse visual data (e.g., using a visual tracking solution) from the image data with inertial data from the measurements to determine a position and motion of the system 200 relative to the physical world (e.g., the scene) and a map of the physical world. As described below, in some examples, when tracking the pose of the system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the system 200 within the scene and the 3D map of the scene, etc. The 3D map can provide a digital representation of a scene in the real/physical world. In some examples, the 3D map can anchor location-based objects and/or content to real-world coordinates and/or objects. The system 200 can use a mapped scene (e.g., a scene in the physical world represented by, and/or associated with, a 3D map) to merge the physical and virtual worlds and/or merge virtual content or objects with the physical environment. For example, the system 200 may compare features detected in current images of the environment against features detected in previous images of the environment. In some cases, the features detected in previous images of the environment may be stored in the 3D map.

In some aspects, the pose of image sensor 202 and/or the system 200 as a whole can be determined and/or tracked by the compute components 210 using a visual tracking solution based on images captured by the image sensor 202 (and/or other camera of the system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment may be modeled by system 200) is created while simultaneously tracking the pose of a camera (e.g., image sensor 202) and/or the system 200 relative to that map. The map can be referred to as a SLAM map, and can be three-dimensional (3D). The SLAM techniques can be performed using color or grayscale image data captured by the image sensor 202 (and/or other camera of the system 200), and can be used to generate estimates of 6 DoF pose measurements of the image sensor 202 and/or the system 200. Such a SLAM technique configured to perform 6 DoF tracking can be referred to as 6 DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6 DoF SLAM (e.g., 6 DoF tracking) can associate features observed from certain input images from the image sensor 202 (and/or other camera) to the SLAM map. For example, 6 DoF SLAM can use feature point associations from an input image to determine the pose (position and orientation) of the image sensor 202 and/or system 200 for the input image. 6 DoF mapping can also be performed to update the SLAM map. In some cases, the SLAM map maintained using the 6 DoF SLAM can contain 3D feature points triangulated from two or more images. For example, key frames can be selected from input images or a video stream to represent an observed scene. For every key frame, a respective 6 DoF camera pose associated with the image can be determined. The pose of the image sensor 202 and/or the system 200 can be determined by projecting features from the 3D SLAM map into an image or video frame and updating the camera pose from verified 2D-3D correspondences.

In some cases, it may be difficult to move a handheld imaging device (e.g., image capture device) along a pre-defined path (e.g., planned trajectory) when capturing images as it can be difficult for a person to move their hands smoothly and accurately along the predefined path. Gener-ally, to capture images along such a predefined path, an image capture device may be mounted to a device that can be moved along a rail or track. For example, the image capture device may be mounted to a dolly, which may be physical vehicle that can be moved along a rail, track, road, or another physical path through an environment. However, physical dollies may be expensive, cumbersome, and/or difficult to use.

Figure 3:
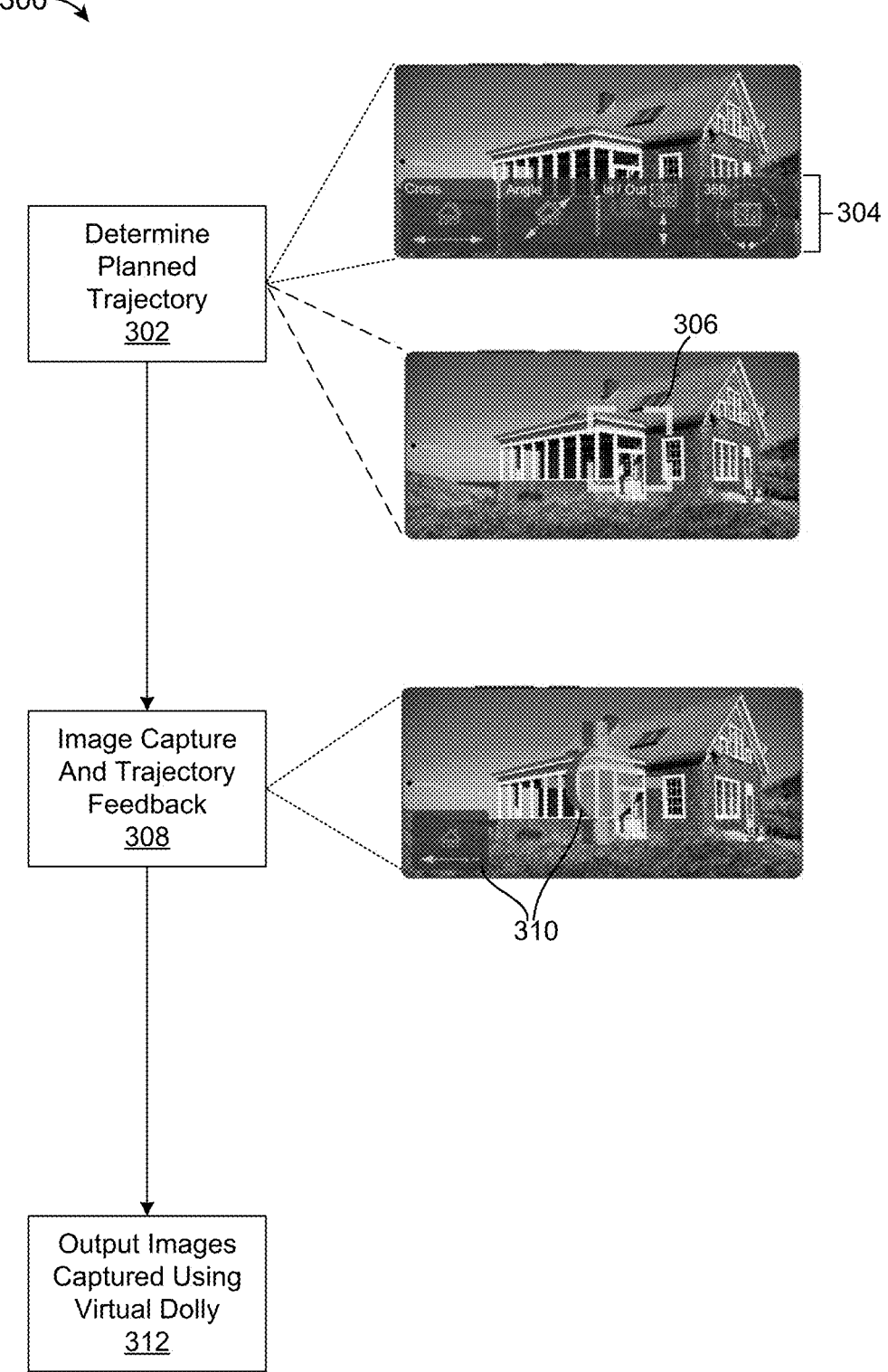
FIG. 3 is a flow diagram illustrating a technique for using a virtual dolly camera to capture images, in accordance with aspects of the present disclosure.

FIG. 3 is a flow diagram illustrating a technique 300 for using a virtual dolly camera to capture images, in accor-dance with aspects of the present disclosure. In some cases, the technique 300 may be performed by an enhanced image capture and processing system, such as enhanced image capture and processing system 200. As shown in FIG. 3, after an indication to capture images using a virtual dolly camera is received, a planned trajectory may be determined 302. This planned trajectory may be a virtual path along which the image capture device may be moved while capturing images. This virtual path is analogous to a physi-cal path or track a physical dolly may travel along while capturing images. As a part of determining the planned trajectory, a set of pattern trajectories 304 may be presented for selection, along with options for configuring the pattern trajectories, such as a speed for the trajectory, whether to zoom along the trajectory, whether to base the trajectory on an object, etc. The set of pattern trajectories may be a set of commonly used trajectories (e.g., shots) for capturing images, such as a dolly in/out shot, dolly zoom, truck shot, tracking shot, 360 orbiting shot, etc. In response to a received selection of a pattern trajectory (e.g., an intended trajectory) from the set of pattern trajectories 304, the planned trajectory may be determined based on the selected pattern trajectory (and selected options for tuning the pattern trajectory) for an environment around the image capture device.

In some cases, to perform a virtual dolly camera shot, the image capture device may be moved through the environ-ment along the planned trajectory. As not all environments are the same, an intended trajectory (e.g., based on a pattern trajectory) may be adapted to the environment. In some cases, aspects of the environment may be detected and these aspects taken into consideration when determining the planned trajectory. These aspects may include a size of the environment, objects in the environment, where the image capture device is in relation to the objects in the environ-ment, selected pattern trajectory, etc. As an example, where a truck shot is selected as the intended trajectory, a deter-mination of the planned trajectory may take into account the size of the environment, as a twenty foot trucking shot may not be appropriate in a ten foot room. In some cases, information about the environment and a position of the image capture device in the environment may be obtained using visual odometry, 6 DOF, 6 DOF mapping/SLAM techniques, etc. For example, a device for capturing images using a virtual dolly camera may also obtain images of the environment and detect 3D feature points from the obtained images. These 3D feature points may be used to locate the device, locate objects in the environment, and detect aspects of the environment. The planned trajectory for capturing images may be determined, for example, by plotting a path, along with poses of the image capture device on the path, from a first position to a second position on which the image capture device may be moved to the capture images as if the image capture device were on a dolly.

In some cases, the planned trajectory may be determined based on one or more objects. For example, a user interface of the device may allow a user to select an object 306 to base the intended trajectory on. As a more specific example, a pattern trajectory may call for images to be captured along a path curving around a selected object. In such an example, the planned trajectory may be determined based on the selected object by adjusting a scale and/or curvature of the planned trajectory based on a distance, size, shape, etc. of the selected object. In some cases, the distance, size, shape, etc. of the selected object may be determined based on environment and a position of the image capture device in the environment may be obtained using localization and mapping techniques, such as visual odometry, 6 DOF, 6 DOF mapping/SLAM techniques, etc.

In other cases, a planned trajectory may be determined based on a device's locations/poses as the device is moved through an environment. For example, a user may move along an intended trajectory with the device and the device may capture its location and/or pose as it is moved along this intended trajectory. The device may determine a planned trajectory based on the intended trajectory. For example, the intended trajectory may be smoothed to generate the planned trajectory. This smoothing may be performed along multiple axes. In some cases, the planned trajectory may have a similar size/direction/speed as the intended trajectory. In some cases, position, direction, motion, etc. information may be determined based on a pose of the device as the device is moved along the intended trajectory. The pose of the device may be determined using localization and map-ping techniques, such as visual odometry, 6 DOF, 6 DOF mapping/SLAM techniques, etc.

Based on the planned trajectory, images may be captured. For example, the image capture device may begin capturing images while being moved along an actual trajectory from a first position toward a second position. The image capture device may also provide feedback about the movement along actual trajectory in comparison to the planned trajec-tory 308. For example, the image capture device may track its location/pose in the environment as it is capturing images and compare its location/pose to an expected location/pose in the planned trajectory. If the image capture device devi-ates from the expected location/pose in the planned trajec-tory, the image capture device may determine what adjust-ments to the pose would allow the image capture device to return to the planned trajectory. If the adjustments to the pose are within certain thresholds, the image capture device may leverage existing image stabilization techniques to capture images along the planned trajectory. For example, traditional optical image stabilization and digital image stabilization techniques can be adjusted to attempt to align the captured images with expected locations/poses in the planned trajectory (while still smoothing out hand-shake) instead of just attempting to aligning the captured images with each other to cancel out hand-shake.

In some cases, if the image capture device determines that the deviation from the expected locations/poses in the planned trajectory has exceeded the threshold amounts (which may be set based on an amount of motion available with the traditional image stabilization techniques and the threshold amounts may vary between yaw, pitch roll, etc.), feedback indicating that the deviation from the planned trajectory is occurring and/or an indication of how to adjust the pose/movement of the imaging device to bring the imaging device back onto the planned trajectory may be output for display in a user interface. For example, one or more visual indicators 310 may be displayed in the user interface, such as in a virtual view finder, where the visual indicators 310 may display an indication that the image capture device has deviated, how the image capture device has deviated (e.g., translation, backwards/forwards, rotation, movement speed, etc.), and how much the image capture device has deviated from the planned trajectory.

In some examples, if the image capture device has captured deviating images with an associated expected location/pose deviating from the expected locations/poses beyond a threshold distance from the expected locations/poses in the planned trajectory, the image capture device may apply compensation techniques to adjust the captured deviating images so that they appear to have been taken from the planned trajectory. For example, the image capture device may warp or reproject the deviating images. In some cases, applying compensation techniques to the captured images may occur during image capture, or after image capturing using the virtual dolly camera has been completed (e.g., after the image capture device has reached an end of the planned trajectory or otherwise stopped capturing images).

In some cases, the planned trajectory may be determined based the movement of the device through an environment along an intended trajectory. The device may then be moved along the planned trajectory and images captured as the device is moved along the planned trajectory. Image capture (and compensation, if appropriate) along the planned trajectory may be performed in a manner substantially similar to that described above.

Images captured and/or adjusted, using the virtually dolly may be output 312, for example, for storage, playback, etc.

Figure 4:
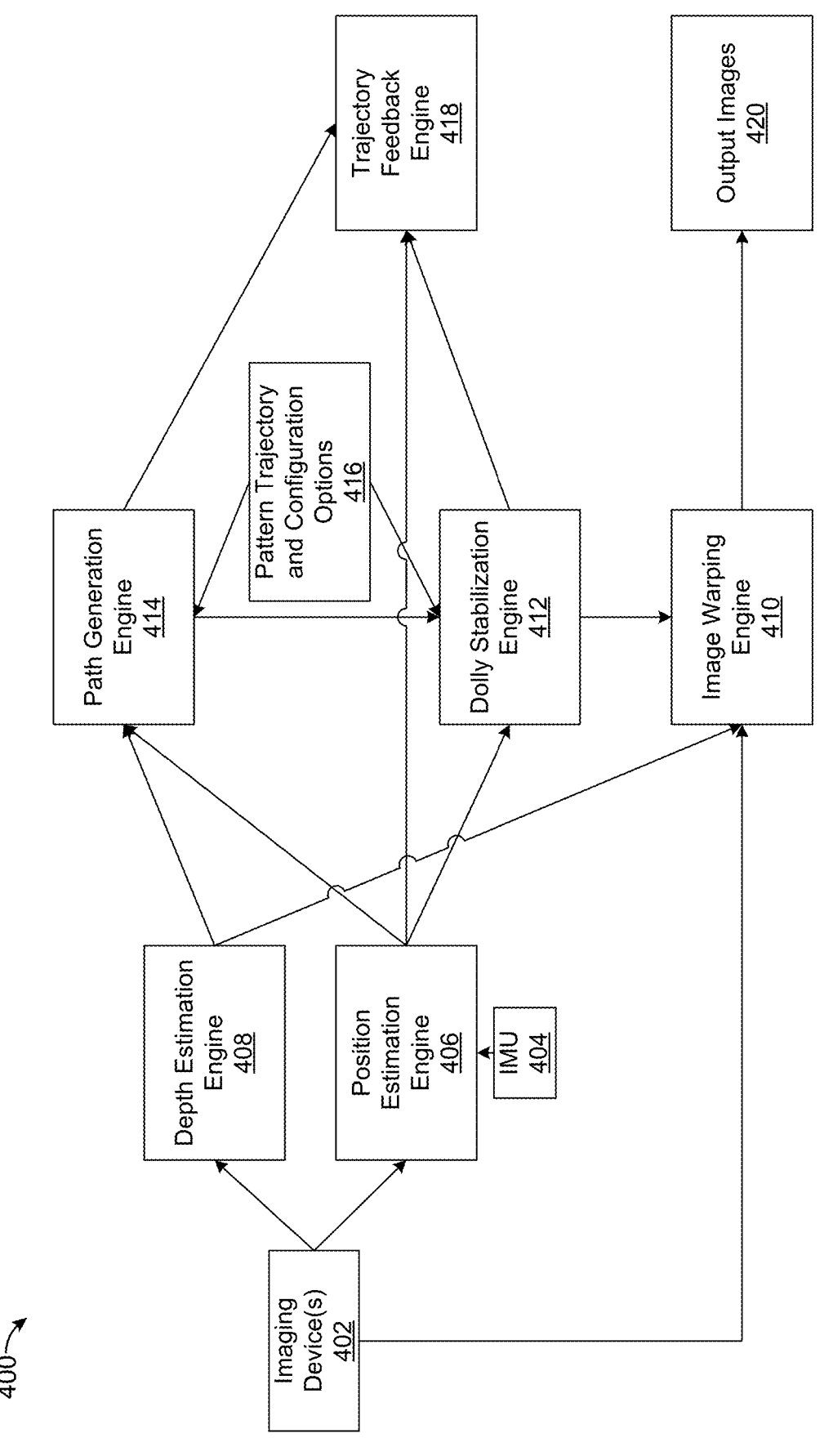
FIG. 4 is a block diagram illustrating an architecture of an image capture device configured to capture images using a virtual dolly camera, in accordance with aspects of the present disclosure.

FIG. 4 is a block diagram illustrating an architecture 400 of an image capture device configured to capture images using a virtual dolly camera, in accordance with aspects of the present disclosure. As shown in FIG. 4, the image capture device includes an imaging device 402 along with an IMU 404. In some cases, the imaging device 402 may correspond with image sensor 202 of FIG. 2 and the IMU 404 may correspond with one or more sensors (e.g., the accelerometer 204, the gyroscope 206, one or more IMUs, and/or other sensors) of the system 200 of FIG. 2. In some cases, as a part of preparing to capture, or capturing, images using the virtual dolly camera, the IMU 404 may output motion information about the image capture device, such as information about a specific force, angular rate, and/or the orientation of the image capture device, to a position estimation engine 406, which may estimate a position of the image capture device in an environment based on the data measuring the motion of the image capture device and images received from the imaging device 402. In some cases, multiple imaging devices 402 may be used (e.g., for depth via stereo depth estimation). In some cases, the imaging device 402 may include sensors for optical depth estimation, such as a time of flight sensor, depth sensor, etc. This position information may be output to a dolly stabilization engine 412, path generation engine 414, and/or trajectory feedback engine 418. In some cases, the position information may also be output to the image warping engine 410 (not shown).

In some cases, the imaging device 402 may generate images of the environment. For example, after the image capture device receives an indication to use the virtual dolly camera, the imaging device 402 may generate and output images to the position estimation engine 406, depth estimation engine 408, and image warping engine 410. In some cases, the imaging device 402 may also output images to the trajectory feedback engine 418 (not shown). Some of the images output by the imaging device 402 may be processed by the assisted visual odometry engine 406, depth estimation engine 408, and/or other component of the image capture device to generate position information, depth information, preview images, etc., without storing the image in a long-term storage device (e.g., flash memory, hard drive, etc.). In some cases, images output by the imaging device 402 may be stored in the long-term storage device, such as those captured in response to an indication to capture images (e.g., shutter release) and, in this case, passed to the image warping engine 410.

The depth estimation engine 408 may estimate depth information for objects in the environment, for example, based on images from the imaging device 402 using any optical depth estimation technique, such as stereo depth estimation, monocular depth estimation, time of flight, depth sensor, etc. In some cases, the depth estimation engine 408 may be integrated with the position estimation engine 406. The depth information may be output to the path generation engine 414, and/or image warping engine 410.

The path generation engine 414 may receive a selected pattern trajectory along with configuration options for the selected pattern trajectory 416. Based on the selected pattern trajectory (e.g., intended trajectory), configuration options for the selected pattern trajectory, pose information for the image capture device and/or map information about the environment around the image capture device (e.g., objects in the environment, aspects of the environment, etc.), and depth information, the path generation engine 414 may determine a planned trajectory for the virtual dolly camera though the environment. The planned trajectory may include a set of locations and poses the imaging device should have at certain times when capturing images using the virtual dolly camera. The path generation engine 414 may output the planned trajectory to the dolly stabilization engine 412 and the trajectory feedback engine 418.

The dolly stabilization engine 412 may receive the planned trajectory and location and/or pose information and the dolly stabilization engine 412 may determine a difference between the expected position (e.g., from the planned trajectory) and the actual position and/or what adjustments to the pose would allow the image capture device to return to the planned trajectory. In some cases, the dolly stabilization engine 412 may interface with existing image stabilization techniques to capture images along the planned trajectory. The dolly stabilization engine 412 may output the difference between the expected position and actual position and/or adjustment information to the trajectory feedback engine 418 to generate feedback for presentation in a user interface indicating that the deviation from the planned trajectory is occurring and/or an indication of how to adjust the pose/movement of the imaging device to bring the imaging device back onto the planned trajectory. For example, the trajectory feedback engine 418 may generate graphical elements (e.g., generate and output the graphical elements) which may be overlayed (e.g., placed on top) of images from the imaging device 402 in a display and/or viewfinder of the device. In some cases, the trajectory feedback engine 418 may also receive images from the imaging device 402 (not shown) and the trajectory feedback engine 418 may overlay the graphical elements on the images from the imaging device 402 and output the images and graphical elements for display by a display and/or viewfinder of the device.

The warping engine 410 may receive images from the imaging device 402 and warp those images based on information received from the depth estimation engine 408 and dolly stabilization engine 412. The warping engine 410 may warp or reproject the deviating images which were obtained when the image capture device is in a location/pose that deviates from the planned trajectory by more than one or more threshold distances. The warped images along with images obtained on or close to the planned trajectory may be output 420, for example, for storage, display, etc.

Figure 5:
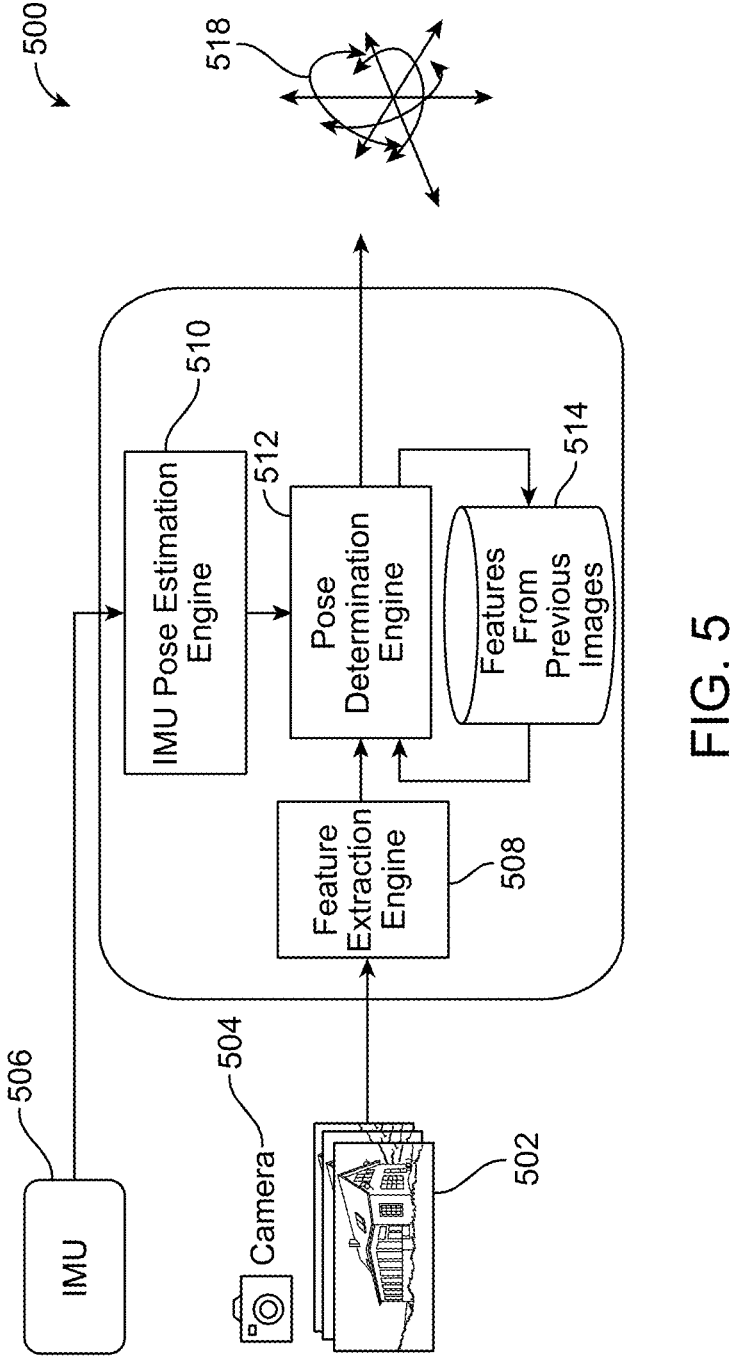
FIG. 5 is a block diagram illustrating a position estimation engine, in accordance with aspects of the present disclosure.

FIG. 5 is a block diagram illustrating a position estimation engine 500, in accordance with aspects of the present disclosure. In some cases, the position estimation engine 500 may be substantially similar to position estimation engine 406 of FIG. 4. As shown, the position estimation engine 500 may receive images 502 from one or more imaging devices 504 and motion information from an IMU 506. Images 502 may be received by a feature extraction engine 508 which may extract feature points from the received images 502. For example, the feature extraction engine 508 may be machine learning (ML) based (or non ML based) and include one or more feature extractors for detecting and extracting current feature points (e.g., current features) in the received images. Examples of feature extractors may include scale invariant feature transform (SIFT), speeded up robust features (SURF), features from accelerated segment test (FAST), binary robust independent elementary features (BRIEF), oriented FAST and rotated BRIEF (ORB), and the like.

Motion information from the IMU 506 may be received by an IMU pose estimation engine 510. The IMU pose estimation engine 510 may attempt to estimate the pose based on, for example a previous pose and motion information indicating how the image capture device has moved. In some cases, the IMU pose estimation engine 510 may output an orientation angle indicating how the image capture device is oriented in the environment to the pose determination engine 512.

The pose determination engine 512 may receive the orientation angle information along with extracted features from the feature extraction engine 508. In some cases, the pose determination engine 512 may obtain features from one or more previous images from a database of features from previous images 514. Based on the features from the previous image, current features from the feature extraction engine 508, and motion information, the pose determination engine 512 may determine a current pose by comparing relative offsets between features of the previous image and corresponding current features, for example, using triangulation, as well as the motion information. Current features may also be stored in the database for features from previous images 514 for later use (e.g., for images captured at a later point in time). The determined current pose (e.g., indicating the camera's position and direction in space (e.g., in the environment) from the pose determination engine 512 may be output 518.

Figure 6:
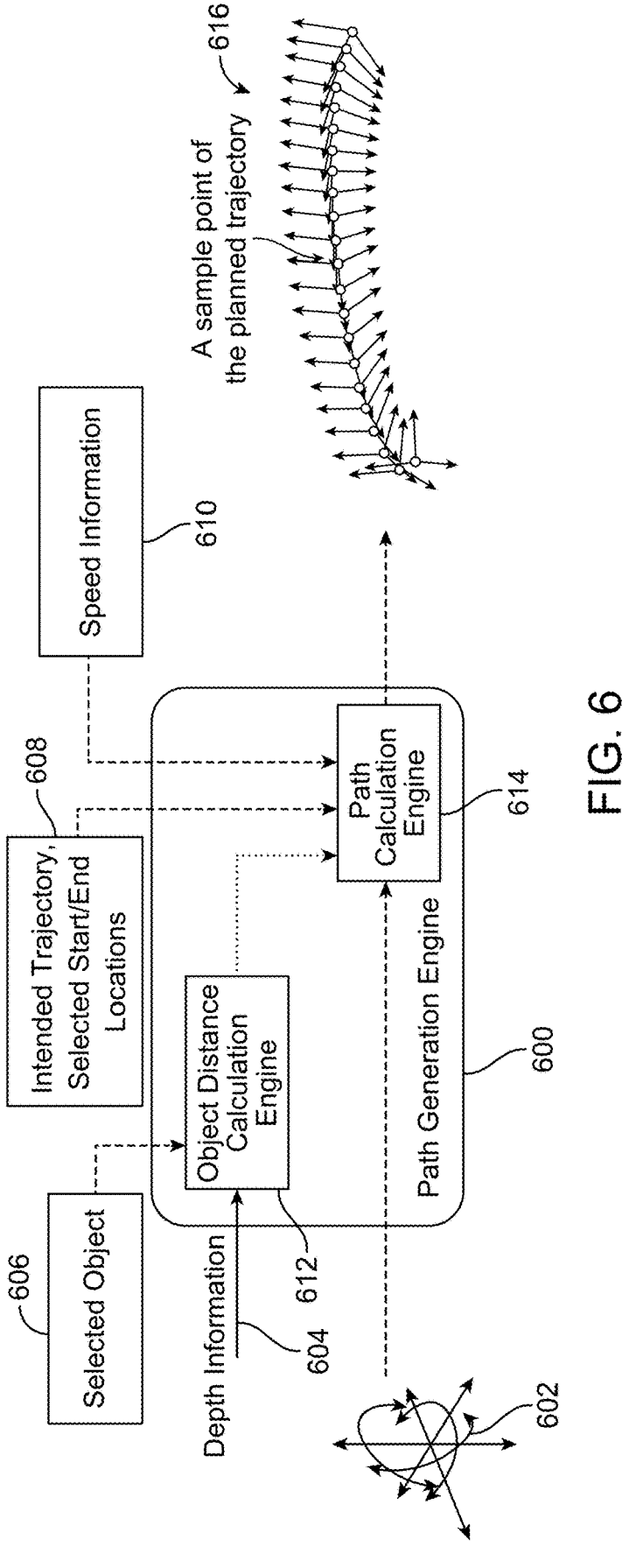
FIG. 6 is a block diagram illustrating a path generation engine, in accordance with aspects of the present disclosure.

FIG. 6 is a block diagram illustrating a path generation engine 600, in accordance with aspects of the present disclosure. In some cases, the path generation engine 600 may be substantially similar to path generation engine 414 of FIG. 4. As shown, the path generation engine 600 may receive a determined position 602 of the image capture device (e.g., from the position estimation engine 500 of FIG. 5) and depth information 604 (e.g., from the depth estimation engine 408 of FIG. 4). In some cases, the depth information 604 may be a depth map associated with one or more images received from an imaging device. In some cases, the path generation engine 600 may also receive an indication of a selected object 606 (e.g., selected object 306 of FIG. 3), intended trajectory information and/or an indication of starting position and ending position 608, a selected pattern trajectory, and/or speed information 610. In some cases, an intended trajectory may be based on a selected pattern trajectory or based on movement of the device through the environment (e.g., position/pose information captured as the device is moved). The intended trajectory may refer to a set of trajectory information (e.g., indication of a selected pattern trajectory, position/pose information for moving an image capture device through an environment) that may be refined to a planned trajectory. In some cases, the pattern trajectory may include a starting position and an ending position along with an indication of a pattern for intermediate positions between the starting position and ending position. For example, the indication of a pattern may indicate that the intermediate positions may be in a straight line between the starting position and ending position. As another example, the indication of a pattern may indicate that the intermediate positions may curve around an object between the staring position and ending position. In some cases, a starting position and ending position may be defined, for example, by a user. For example, a user may walk to (or point the image capture device at) a location in the environment and set that location as a starting position and then walk to (or point to) another location and set that other location as an ending position. The starting position, ending position, and intermediate positions between the staring position and ending position may define the intended trajectory. The speed information 610 may be an indication of how fast the virtual trolly shot may be performed (e.g., how fast to move along the planned trajectory).

In some cases, the depth information 604 and the indication of the selected object 606, if selected, may be input to an object distance calculation engine 612. The object distance calculation engine may determine a distance and/or size of the selected object 606 to help determine a size for the planned trajectory to match the distance and/or size of the selected object 606. In some cases, an indication may be presented, for example, to the user, prompting the user to move the image capture device around the object to help define the intended trajectory. The determined distance and/or size information may be output from the object distance calculation engine 612 and inputted into the path calculation engine 614.

The path calculation engine 614 may receive the determined distance and/or size information along with the determined position 602 of the image capture device, the intended trajectory information and/or an indication of starting position and ending position 608, and speed information 610 and determine the planned trajectory. When determining the planned trajectory, the path calculation engine 614 may use the determined (e.g., current) position of the image capture device as a starting point of the planned trajectory. In some cases, a pattern trajectory may be scaled based on the speed information 610 and a length between the starting position and the ending position when determining the planned trajectory. In cases where an object is selected, a pattern trajectory may be scaled based on a distance to the object and/or size of the object, along with the speed information 610 when determining the planned trajectory. In some cases, the path calculation engine 614 may also determine the planned trajectory based on a size of the environment or location of other objects in the environment.

In some cases, path calculation engine 614 may output a sparse set of 3D locations and poses 616 (e.g., planned trajectory information, sparse trajectory) of the image capture device as the planned trajectory. In some cases, the sparse set of 3D locations and poses 616 may be interpolated to generate a more detailed set of 3D locations and poses. This more detailed set of 3D locations and poses may include 3D locations and poses on a based on a certain time frame (e.g., per second 3D locations and poses), a number of frames (e.g. 3D location and poses for every 5 frames), or a frame-by-frame set of 3D locations and poses. In some cases, multiple sets of interpolated 3D locations and poses may be generated. For example, the frame-by-frame set of 3D locations and poses may be used to warp images so that the images appear to be obtained from a particular 3D location and pose, and a per second 3D locations and poses used for generating feedback to the user for how to move the image capture device to bring the image capture device back to the planned trajectory.

Figure 7:
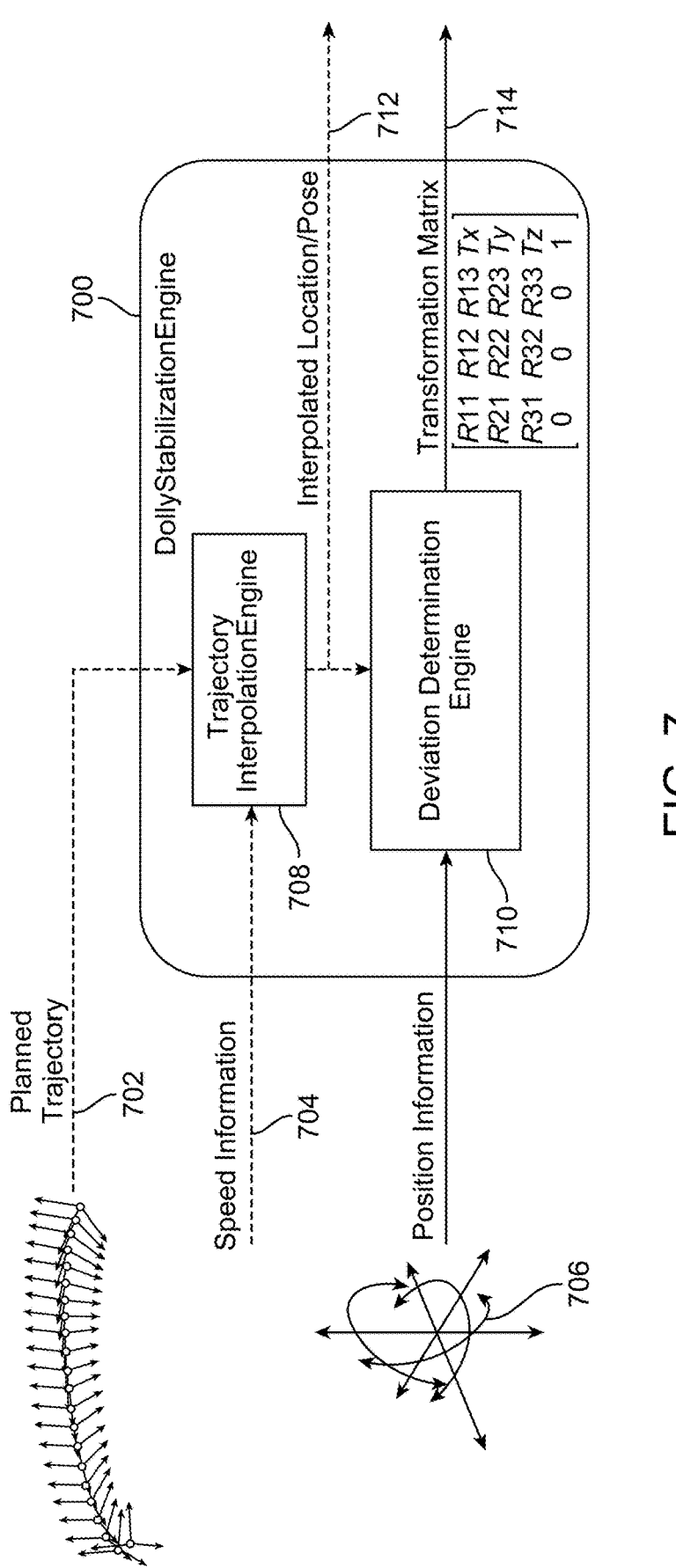
FIG. 7 is a block diagram illustrating a dolly stabilization engine, in accordance with aspects of the present disclosure.

FIG. 7 is a block diagram illustrating a dolly stabilization engine 700, in accordance with aspects of the present disclosure. In some cases, the dolly stabilization engine 700 may be substantially similar to dolly stabilization engine 412 of FIG. 4. As shown, the dolly stabilization engine 700 may receive the planned trajectory 702 as sparse set of 3D locations and poses of the image capture device along with speed information 704 and determined (e.g., current) position 706 of the image capture device. The planned trajectory 702 and speed information 704 may be input to a trajectory interpolation engine 708. In some cases, a 3D location and pose may be calculated on a per-image basis to accurately determine whether a image needs correction (e.g., warping). In some cases, the trajectory interpolation engine 708 may interpolate the sparse planned trajectory 702 to determine a per-image 3D location and pose. The interpolation of the 3D location may be performed, for example, using trilinear, tricubic, or another 3D interpolation technique. The pose (e.g., orientation angle) may be interpolated, for example, using linear interpolation techniques, quaternion interpolation techniques, spherical linear interpolation techniques, or another interpolation technique. Positions within the sparse planned trajectory 702 to interpolate for may be determined based on the speed information (e.g., points of the sparse planned trajectory per second) and the current time. The interpolated locations and poses 712 along the planned trajectory may be output from the dolly stabilization engine 700 and also output to the deviation determination engine 710. The deviation determination engine 710 may calculate a transformation matrix 714 to determine what adjustments (e.g., rotation and translation) to the location/pose would allow the image capture device to return to the planned trajectory. In some cases, the transformation matrix calculation may be performed in such a way so as to avoid pixels which would be outside of a field of view of the cameras of the image capture device. In some cases, transformations for zooming in/out may also be made. In some cases, the deviation determination engine 710 may calculate a grid of samples (e.g., a N×M sized mesh) which maps one image to another. The grid of samples may also a transform based on sample points inside the image to be performed. This grid of samples may be output by the deviation determination engine 710.

Figure 8:
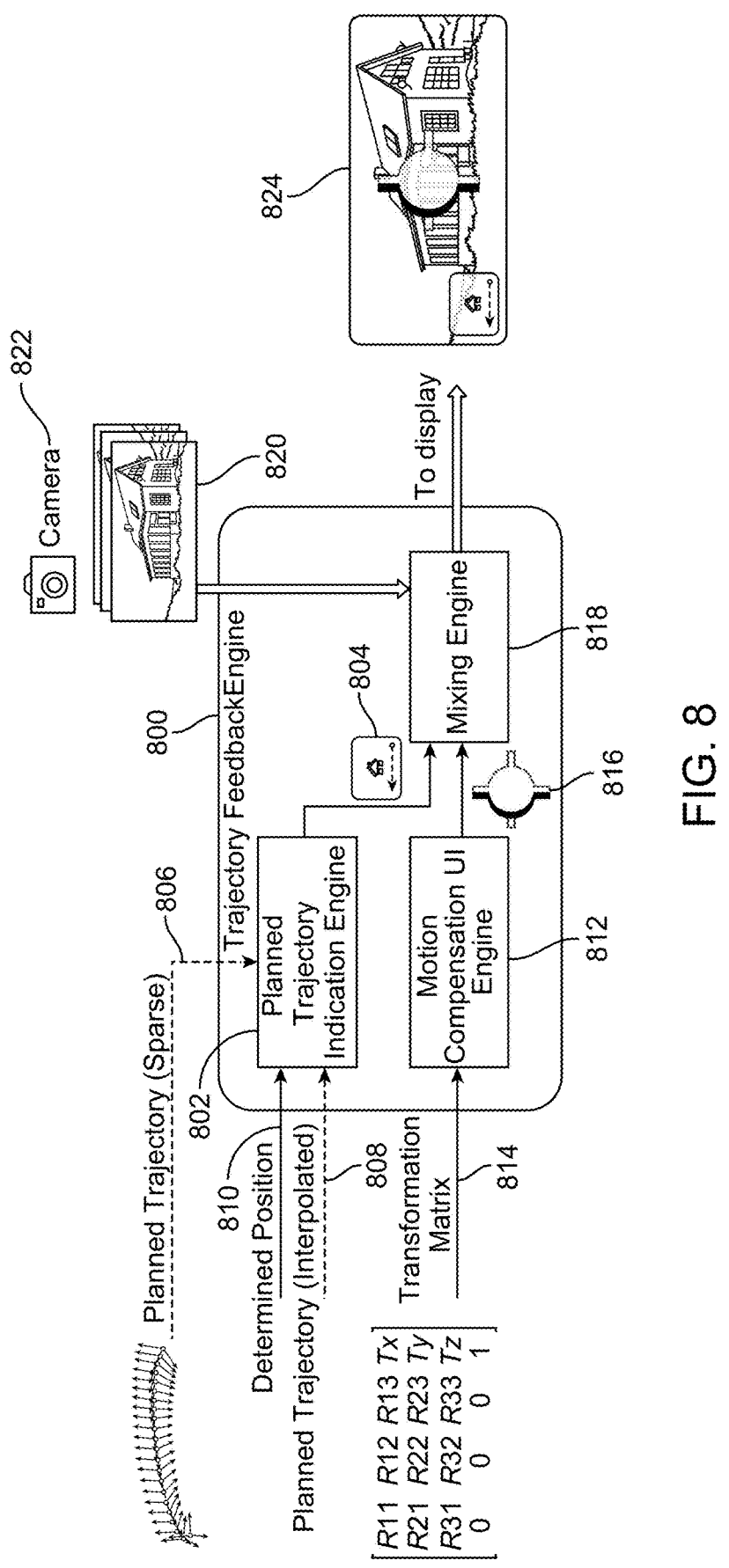
FIG. 8 is a block diagram illustrating a trajectory feedback engine, in accordance with aspects of the present disclosure.

FIG. 8 is a block diagram illustrating a trajectory feedback engine 800, in accordance with aspects of the present disclosure. In some cases, the trajectory feedback engine 800 may be substantially similar to trajectory feedback engine 418 of FIG. 4. As shown, a planned trajectory indication engine 802 may generate a UI representation of one or more portions of the planned trajectory (e.g., to overlay images of the environment prior to image capture using the virtual dolly) and/or a graphical representation 804 of how image capture using the virtual dolly is progressing against the planned trajectory in terms of speed (e.g., how far along the planned trajectory the image capture device should be as compared to how far along the image capture device actually is). The planned trajectory indication engine 802 may generate the UI representations based on a received planned trajectory, either the sparse trajectory 806 (e.g., planned trajectory information), or interpolated locations and poses 808, and the determined (e.g., current) position 810 of the image capture device.

A motion compensation UI engine 812 of the trajectory feedback engine 800 may receive a transformation matrix 814 (e.g., from deviation determination engine 710 of FIG. 7) (or grid of samples) and the motion compensation UI engine 812 may generate a graphical representation 816 of a rotation and translation that may be applied to the image capture device to align the image capture device with the planned trajectory. In some cases, offsets for correcting the rotation and translation of the image capture device to align the image capture device with the planned trajectory may be indicated using a colored shape that is offset with a different colored shape such that aligning the different colored shapes may align the image capture device with the planned trajectory. The graphical representations 804 and 816 and may be mixed (e.g., overlayed over) by a mixing engine 818 with images 820 received from camera(s) 822 of the image capture device to generate an overlaid preview image 824. In some cases, the images 820 may be preview images for display in a virtual view finder (e.g., display) of the image capture device.

Figure 9:
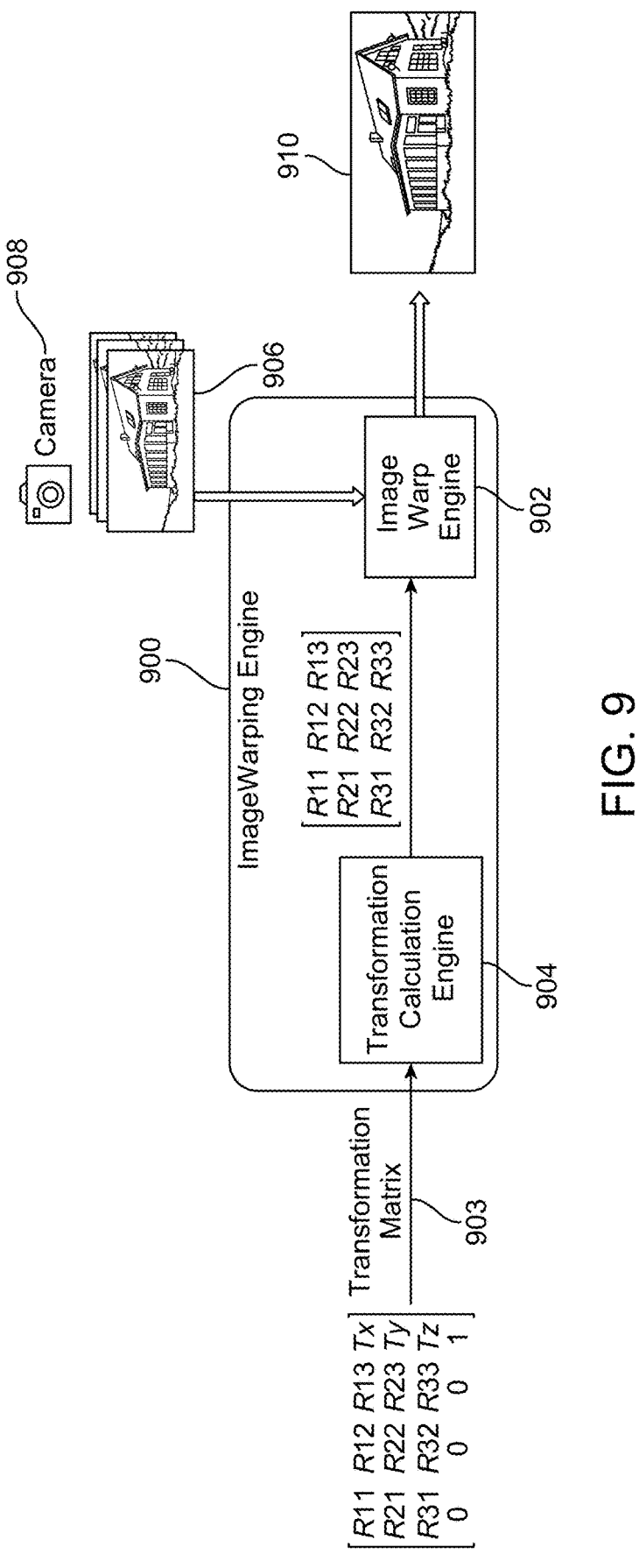
FIG. 9 is a block diagram illustrating an example of an image warping engine, in accordance with aspects of the present disclosure.

FIG. 9 is a block diagram illustrating an example of an image warping engine 900, in accordance with aspects of the present disclosure. In some cases, the image warping engine 900 may be substantially similar to image warping engine 410 of FIG. 4. As shown, the image warping engine 900 may include an image warp engine 902 and a transformation calculation engine 904. The transformation calculation engine 904 may receive a transformation matrix 903 (e.g., such as transformation matrix 714 of FIG. 7). Based on the received transformation matrix 903, the transformation calculation engine 904 may determine a perspective transformation which may be applied to images 906 obtained from a camera 908 of the image capture device. For example, the images 906 may be received by the image warp engine 902 along with a perspective transform matrix from the transformation calculation engine 904. The image warp engine 902 may apply the received perspective transform matrix to the images 906 to apply a perspective transformation to correct for a rotational deviation of the images 906 from the planned trajectory. In some cases, the transformation calculation engine 902 may receive the transformation matrix 903 and determine a 2D gird mapping for the images that may be applied (e.g., by the image warp engine 902) to correct the images 906. The corrected images may then be output 910, for example, for storage, display, etc.

Figure 10:
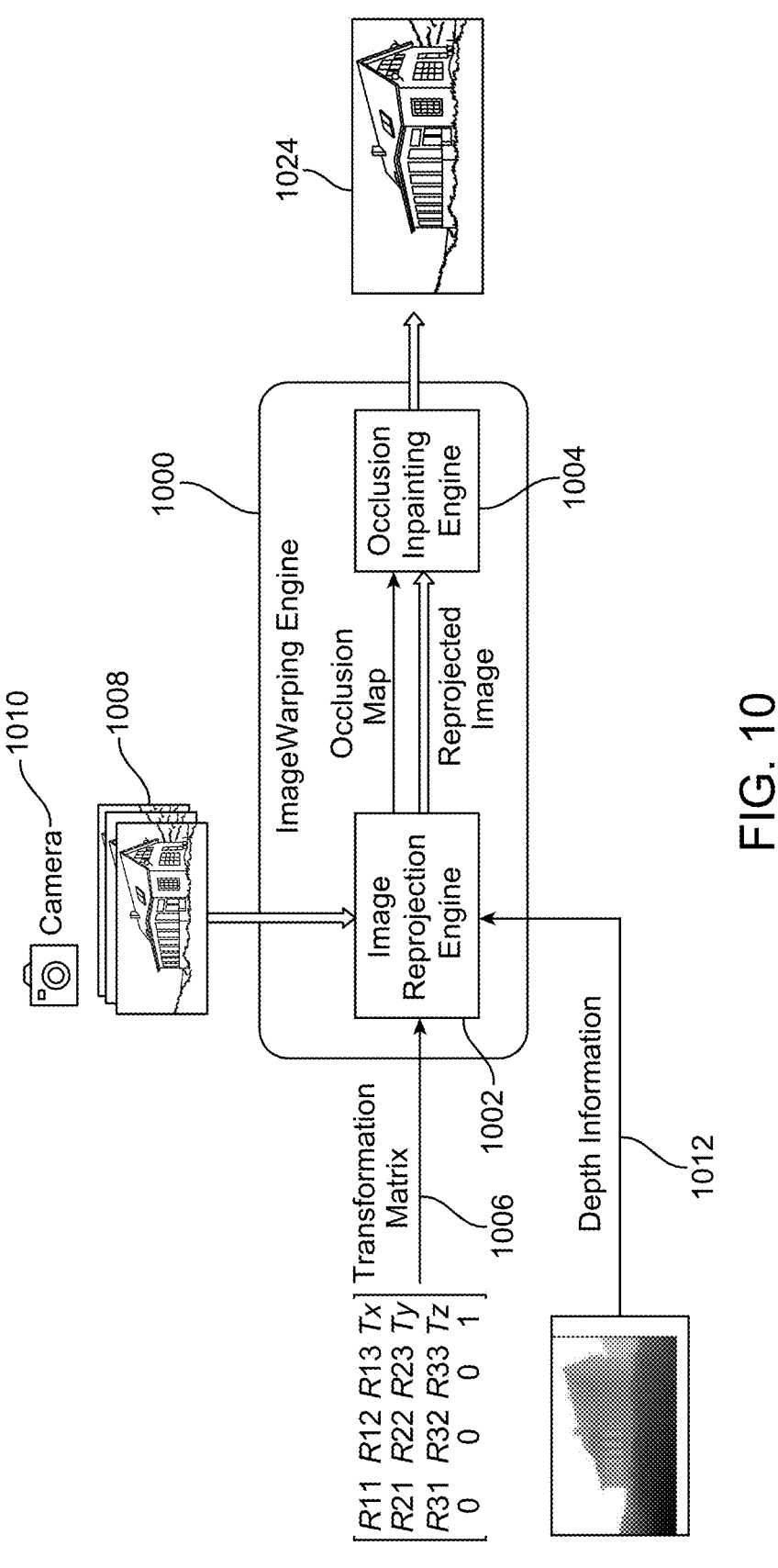
FIG. 10 is a block diagram illustrating another example of an image warping engine, in accordance with aspects of the present disclosure.

FIG. 10 is a block diagram illustrating another example of an image warping engine 1000, in accordance with aspects of the present disclosure. In some cases, the image warping engine 1000 may be substantially similar to image warping engine 410 of FIG. 4. As shown, the image warping engine 1000 may include an image reprojection engine 1002 and optionally an occlusion inpainting engine 1004. The image reprojection engine 1002 may receive a transformation matrix 1006 (e.g., such as transformation matrix 714 of FIG. 7) along with images 1008 obtained from a camera 1010 of the image capture device, and corresponding depth information 1012, such as a depth map based on the images 1008. The image reprojection engine 1002 may reproject (e.g., warp images 1008 based on depth and pose to correct for translational and rotational deviation of the images 906 from the panned trajectory. In some cases, warping images to correct for translational deviation can expose gaps where previously occluded areas (e.g., of a background by a foreground object) become visible. The depth information 1012 may be used to identify areas that previously occluded. In some cases, warping may also be applied to background pixels in the previously occluded areas to fill in the gaps. The warped images may then be output 1024.

In other cases, the non-occluded pixels may be warped and inpainting may be performed by the occlusion inpainting engine 1004 based on an occlusion map (indicating which pixels were previously occluded and are now visible) and the reprojected image. The occlusion inpainting engine 1004 may attempt to fill in the gap, for example, based on pixels neighboring the occluded pixels at a similar depth. The warped and inpainted images may then be output 1024.

Figure 11:
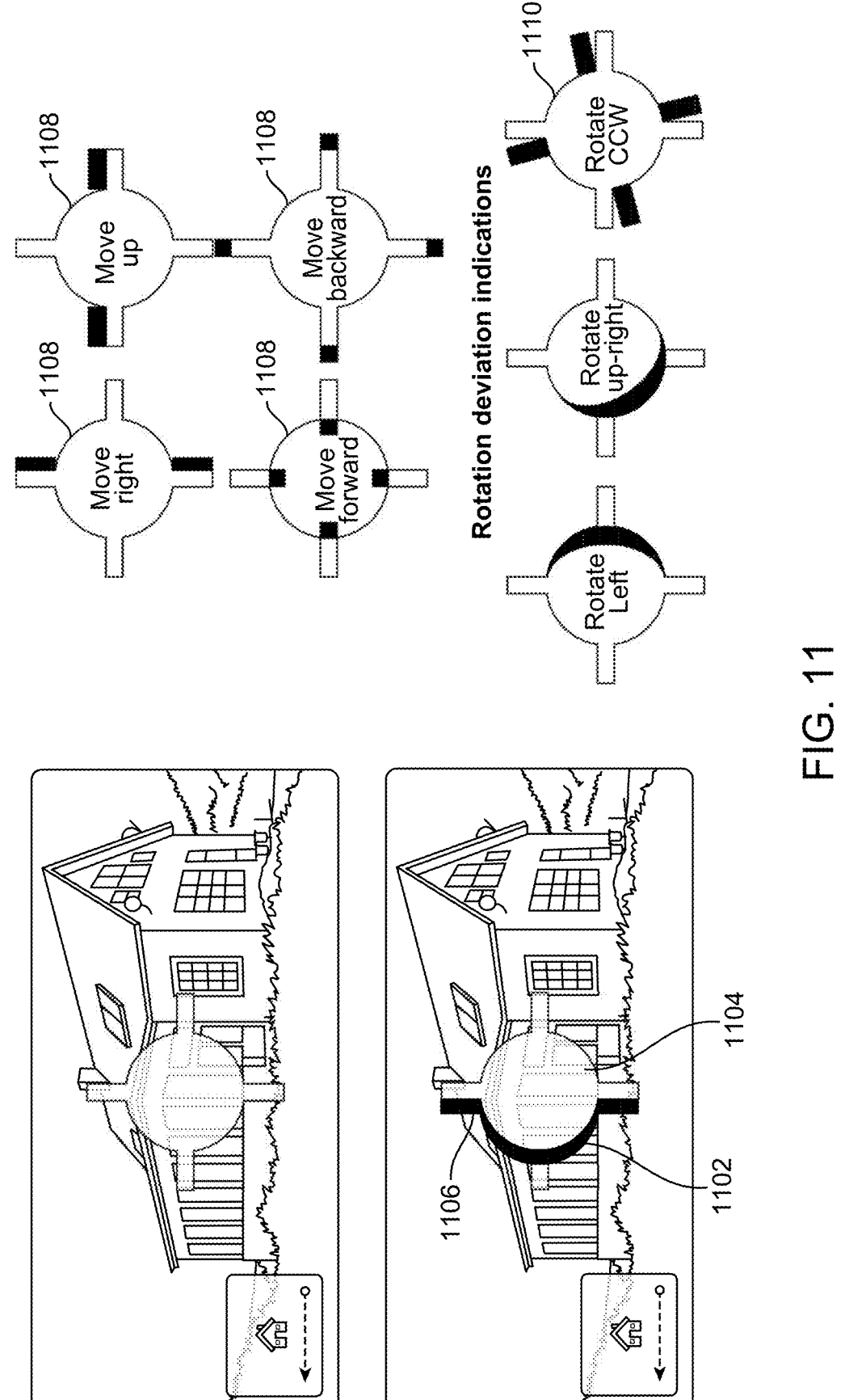
FIG. 11 illustrates examples of graphical representations for providing feedback of deviation from the planned trajectory.

FIG. 11 illustrates examples of graphical representations for providing feedback of deviation from the planned trajectory. In some cases, as the image capture device is moved along the planned trajectory, feedback, such as a visual indication in a UI, audio prompt, haptic feedback, etc., may be provided. As indicated above, the visual indication may be a graphical representation of how a current position/pose of the image capture device is deviating from the planned trajectory and how to correct for the deviation. For example, the graphical representation may include two different colored shapes, one representing the planned trajectory 1102 and the other representing the current position/pose 1104 of the image capture device. Where the two different colored shapes completely overlap, the image capture device may be matching (or within a threshold distance of) an expected location/pose indicated in the planned trajectory. Different portions of the colored shape corresponding to the current position/pose may become visible based on how the current position/pose differs from the planned trajectory. For example, a circular portion of the colored shape may represent rotation (e.g., panning) of the imaging device. The circular portion 1106 of the colored shape corresponding to the planned trajectory 1102 becoming visible provides feedback indicating that the image capture device should be panned left in this example. In some cases, rectangular portions of the colored shapes 1108 may represent translation motion (e.g., moving the imaging capturing device left/right, up/down) and when some parts of the rectangular portions of the colored shapes 1108 a translation motion may be indicated. In some cases, the rectangular portion of the colored shapes may also be used to indication a rotation of the image capture device along an optical axis of the image capture device as shown in graphical representation 1110.

FIG. 12 is a flow diagram illustrating a process 1200 for capturing images, in accordance with aspects of the present disclosure. The process 1200 may be performed by a image capture device (e.g., via image capture and processing system 100 of FIG. 1, enhanced image capture and processing system 200 of FIG. 2), computing device (or apparatus)

(e.g., computing system 1300) or a component (e.g., a chipset, codec, host processor 152 of FIG. 1, image processor 150 of FIG. 1, ISP 154 of FIG. 1, compute components 210 of FIG. 2, image processing engine 224 of FIG. 2, processor 1310 of FIG. 13, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 1200 may be implemented as software components that are executed and run on one or more processors.

At block 1202, the computing device (or component thereof) may receive an indication of a planned trajectory (e.g., how the device should be moved through the environment) through an environment from a first position towards a second position. In some cases, the computing device (or component thereof) may receive an indication of a intended trajectory; receive an indication of the first position; and determine the planned trajectory through the environment based on the intended trajectory and the indication of the first position. In some examples, the intended trajectory is based on a set of pattern trajectories (e.g., set of pattern trajectories 304 of FIG. 3). In some cases, the computing device (or component thereof) may receive a selected pattern trajectory from the set of pattern trajectories, wherein the intended trajectory is based on the selected pattern trajectory. In some examples, the intended trajectory is based on a movement of the image capture device through the environment. In some cases, the computing device (or component thereof) may receive an indication of a selected object (e.g., object 306 of FIG. 3) in the environment and determine a distance to the selected object, and wherein the planned trajectory is further determined based on the determined distance to the selected object. In some examples, the computing device (or component thereof) may determine the planned trajectory by determining the second position based on the distance to the selected object. In some cases, the computing device (or component thereof) may determine a size of the selected object, and wherein the planned trajectory is further determined based on the determined size of the selected object. In some examples, the computing device (or component thereof) may receive an indication of a speed for moving towards the second position, and wherein the planned trajectory is further determined based on the indicated speed. In some examples, the planned trajectory comprises a set of locations and poses for the image capture device between the first position and the second position.

At block 1204, the computing device (or component thereof) may determine a location of an image capture device in the environment (e.g., via an IMU 506 of FIG. 5). In some cases, the computing device (or component thereof) may determine the location of an image capture device in the environment by obtaining a first image of the environment from a first location; obtaining a first feature from the first image; obtaining a second image of the environment from a second location; obtaining a corresponding second feature from the second image; obtaining motion information indicating a motion of the image capture device from the first location to the second location; and determining the location of the image capture device based on the motion information and a comparison of the first feature and the corresponding second feature. In some examples, the image capture device comprises a head mounted display.

At block 1206, the computing device (or component thereof) may obtain an image from the image capture device (e.g., via an image capture and processing system 100 of FIG. 1) at a third position (e.g., an intermediate position). In some cases, the computing device (or component thereof) may provide feedback (e.g., via visual indicators 310 of FIG. 3, graphical representation 816 of FIG. 8, trajectory feedback engine 800 of FIG. 8, colored shapes 1108 of FIG. 11, etc.) regarding the location of the image capture device relative to the planned trajectory. In some examples, feedback regarding the location of the image capture device with respect to the planned trajectory is provided when the location of the image capture device with respect to the planned trajectory exceeds a threshold distance. In some cases, the feedback comprises at least one of a visual indication, audio prompt, and haptic feedback. In some examples, the feedback comprises a visual indication (e.g., via visual indicators 310 of FIG. 3, graphical representation 816 of FIG. 8, colored shapes 1108 of FIG. 11, etc.) that indicates how a current position of the image capture device is deviating from the planned trajectory.

At block 1208, the computing device (or component thereof) may transform (e.g., warp, reproject, etc.) the image based on a difference between the third position and a corresponding position in the planned trajectory. In some cases, the computing device (or component thereof) may transform the image by determining a transformation based on the difference between the location of the image capture device and the planned trajectory when the image was obtained; and apply the transformation to the image. In some examples, the computing device (or component thereof) may to transform the image by determining a reprojection transform based on the difference between the location of the image capture device and the planned trajectory when the image was obtained; and apply the reprojection transform to the image.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/ pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/ L5/L#), resistive random-access memory (RRAM/Re-RAM), phase change memory (PCM), spin transfer torque RAM (STT-RAM), another memory chip or cartridge, and/ or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for capturing images, comprising: at least one memory; and at least one processor coupled to the at least one memory, the at least one processor being configured to: receive an indication of a planned trajectory through an environment from a first position towards a second position; determine a location of an image capture device in the environment; obtain an image from the image capture device at a third position; and transform the image based on a difference between the third position and a corresponding position in the planned trajectory.

Aspect 2. The apparatus of Aspect 1, wherein the at least one processor is further configured to: receive an indication of a intended trajectory; receive an indication of the first position; and determine the planned trajectory through the environment based on the intended trajectory and the indication of the first position.

Aspect 3. The apparatus of Aspect 2, wherein the intended trajectory is based on a set of pattern trajectories.

Aspect 4. The apparatus of Aspect 3, wherein the at least one processor is further configured to receive a selected pattern trajectory from the set of pattern trajectories, wherein the intended trajectory is based on the selected pattern trajectory.

Aspect 5. The apparatus of any of Aspects 2-4, wherein the at least one processor is further configured to: receive an indication of a selected object in the environment; and determine a distance to the selected object, and wherein the planned trajectory is further determined based on the determined distance to the selected object.

Aspect 6. The apparatus of Aspect 5, wherein, to determine the planned trajectory the at least one processor is further configured to determine the second position based on the distance to the selected object.

Aspect 7. The apparatus of any of Aspects 5-6, wherein the at least one processor is further configured to determine a size of the selected object, and wherein the planned trajectory is further determined based on the determined size of the selected object.

Aspect 8. The apparatus of any of Aspects 2-7, wherein the at least one processor is further configured to receive an indication of a speed for moving towards the second position, and wherein the planned trajectory is further determined based on the indicated speed.

Aspect 9. The apparatus of Aspect 2, wherein the intended trajectory is based on a movement of the image capture device through the environment.

Aspect 10. The apparatus of any of Aspects 1-9, wherein, to transform the image, the at least one processor is configured to: determine a transformation based on the difference between the location of the image capture device and the planned trajectory when the image was obtained; and apply the transformation to the image.

Aspect 11. The apparatus of any of Aspects 1-10, wherein, to transform the image, the at least one processor is further configured to: determine a reprojection transform based on the difference between the location of the image capture device and the planned trajectory when the image was obtained; and apply the reprojection transform to the image.

Aspect 12. The apparatus of any of Aspects 1-11, wherein, to determine the location of an image capture device in the environment, the at least one processor is configured to: obtain a first image of the environment from a first location; obtain a first feature from the first image; obtain a second image of the environment from a second location; obtain a corresponding second feature from the second image; obtain motion information indicating a motion of the image capture device from the first location to the second location; and determine the location of the image capture device based on the motion information and a comparison of the first feature and the corresponding second feature.

Aspect 13. The apparatus of any of Aspects 1-12, wherein the planned trajectory comprises a set of locations and poses for the image capture device between the first position and the second position.

Aspect 14. The apparatus of any of Aspects 1-13, wherein the at least one processor is further configured to provide feedback regarding the location of the image capture device relative to the planned trajectory.

Aspect 15. The apparatus of Aspect 14, wherein feedback regarding the location of the image capture device with respect to the planned trajectory is provided when the location of the image capture device with respect to the planned trajectory exceeds a threshold distance.

Aspect 16. The apparatus of any of Aspects 14-15, wherein the feedback comprises at least one of a visual indication, audio prompt, and haptic feedback.

Aspect 17. The apparatus of any of Aspects 14-16, wherein the feedback comprises a visual indication that indicates how a current position of the image capture device is deviating from the planned trajectory.

Aspect 18. The apparatus of any of Aspects 1-17, wherein the image capture device comprises a head mounted display.

Aspect 19. A method for capturing images, comprising: receiving an indication of a planned trajectory through an environment from a first position towards a second position; determining a location of an image capture device in the environment; obtaining an image from the image capture device at a third position; and transforming the image based on a difference between the third position and a corresponding position in the planned trajectory.

Aspect 20. The method of Aspect 19, further comprising: receiving an indication of a intended trajectory; receiving an indication of the first position; and determining the planned trajectory through the environment based on the intended trajectory and the indication of the first position.

Aspect 21. The method of Aspect 20, wherein the intended trajectory is based on a set of pattern trajectories.

Aspect 22. The method of Aspect 21, further comprising receiving a selected pattern trajectory from the set of pattern trajectories, wherein the intended trajectory is based on the selected pattern trajectory.

Aspect 23. The method of any of Aspects 20-22, further comprising: receiving an indication of a selected object in the environment; and determining a distance to the selected object, and wherein the planned trajectory is further determined based on the determined distance to the selected object.

Aspect 24. The method of Aspect 23, wherein determining the planned trajectory includes determining the second position based on the distance to the selected object.

Aspect 25. The method of any of Aspects 23-24, further comprising determining a size of the selected object, and wherein the planned trajectory is further determined based on the determined size of the selected object.

Aspect 26. The method of any of Aspects 20-25, further comprising receiving an indication of a speed for moving towards the second position, and wherein the planned trajectory is further determined based on the indicated speed.

Aspect 27. The method of Aspect 20, wherein the intended trajectory is based on a movement of the image capture device through the environment.

Aspect 28. The method of any of Aspects 19-27, wherein transforming the image comprises: determining a transformation based on the difference between the location of the image capture device and the planned trajectory when the image was obtained; and applying the transformation to the image.

Aspect 29. The method of any of Aspects 19-28, wherein transforming the image comprises: determining a reprojection transform based on the difference between the location of the image capture device and the planned trajectory when the image was obtained; and applying the reprojection transform to the image.

Aspect 30. The method of any of Aspects 19-29, wherein the location of an image capture device in the environment is determined by: obtaining a first image of the environment from a first location; obtaining a first feature from the first image; obtaining a second image of the environment from a second location; obtaining a corresponding second feature from the second image; obtaining motion information indicating a motion of the image capture device from the first location to the second location; and determining the location of the image capture device based on the motion information and a comparison of the first feature and the corresponding second feature.

Aspect 31. The method of any of Aspects 19-30, wherein the planned trajectory comprises a set of locations and poses for the image capture device between the first position and the second position.

Aspect 32. The method of any of Aspects 19-31, further comprising providing feedback regarding the location of the image capture device relative to the planned trajectory.

Aspect 33. The method of Aspect 32, wherein feedback regarding the location of the image capture device with respect to the planned trajectory is provided when the location of the image capture device with respect to the planned trajectory exceeds a threshold distance.

Aspect 34. The method of any of Aspects 32-33, wherein the feedback comprises at least one of a visual indication, audio prompt, and haptic feedback.

Aspect 35. The method of any of Aspects 32-34, wherein the feedback comprises a visual indication that indicates how a current position of the image capture device is deviating from the planned trajectory.

Aspect 36. The method of any of Aspects 19-35, wherein the image capture device comprises a head mounted display.

Aspect 37. A non-transitory computer-readable medium having stored thereon instructions that, when executed by at least one processor, cause the at least one processor to: receive an indication of a planned trajectory through an environment from a first position towards a second position; determine a location of an image capture device in the environment; obtain an image from the image capture device at a third position; and transform the image based on a difference between the third position and a corresponding position in the planned trajectory.

Aspect 37: The non-transitory computer readable medium of Aspect 37, further comprising instructions to cause the at least one processor to perform any of the operations of Aspects 19 to 36.

Aspect 38: An apparatus for capturing images comprising one or more means for performing any of the operations of Aspects 19 to 36.

What is claimed is:

1. An apparatus for capturing images, comprising:
at least one memory; and
at least one processor coupled to the at least one memory, the at least one processor being configured to:
receive user input indicating a planned trajectory through an environment from a first position towards a second position;
determine a location of an image capture device in the environment;
obtain an image from the image capture device at a third position; and
transform the image based on a difference between the third position and a corresponding position in the planned trajectory.

2. The apparatus of claim 1, wherein the at least one processor is further configured to:
receive an indication of a intended trajectory;
receive an indication of the first position; and
determine the planned trajectory through the environment based on the intended trajectory and the indication of the first position.

3. The apparatus of claim 2, wherein the intended trajectory is based on a set of pattern trajectories.

4. The apparatus of claim 3, wherein the at least one processor is further configured to receive a selected pattern trajectory from the set of pattern trajectories, wherein the intended trajectory is based on the selected pattern trajectory.

5. The apparatus of claim 2, wherein the at least one processor is further configured to:
receive an indication of a selected object in the environment; and
determine a distance to the selected object, and wherein the planned trajectory is further determined based on the determined distance to the selected object.

6. The apparatus of claim 5, wherein, to determine the planned trajectory the at least one processor is further configured to determine the second position based on the distance to the selected object.

7. The apparatus of claim 5, wherein the at least one processor is further configured to determine a size of the selected object, and wherein the planned trajectory is further determined based on the determined size of the selected object.

8. The apparatus of claim 2, wherein the at least one processor is further configured to receive an indication of a speed for moving towards the second position, and wherein the planned trajectory is further determined based on the indicated speed.

9. The apparatus of claim 2, wherein the intended trajectory is based on a movement of the image capture device through the environment.

10. The apparatus of claim 1, wherein, to transform the image, the at least one processor is configured to:
determine a transformation based on the difference between the location of the image capture device and the planned trajectory when the image was obtained; and
apply the transformation to the image.

11. The apparatus of claim 1, wherein, to transform the image, the at least one processor is further configured to:
determine a reprojection transform based on the difference between the location of the image capture device and the planned trajectory when the image was obtained; and
apply the reprojection transform to the image.

12. The apparatus of claim 1, wherein, to determine the location of an image capture device in the environment, the at least one processor is configured to:
obtain a first image of the environment from a first location;
obtain a first feature from the first image;
obtain a second image of the environment from a second location;
obtain a corresponding second feature from the second image;
obtain motion information indicating a motion of the image capture device from the first location to the second location; and
determine the location of the image capture device based on the motion information and a comparison of the first feature and the corresponding second feature.

13. The apparatus of claim 1, wherein the planned trajectory comprises a set of locations and poses for the image capture device between the first position and the second position.

14. The apparatus of claim 1, wherein the at least one processor is further configured to provide feedback regarding the location of the image capture device relative to the planned trajectory.

15. The apparatus of claim 14, wherein feedback regarding the location of the image capture device with respect to the planned trajectory is provided when the location of the image capture device with respect to the planned trajectory exceeds a threshold distance.

16. The apparatus of claim 14, wherein the feedback comprises at least one of a visual indication, audio prompt, and haptic feedback.

17. The apparatus of claim 14, wherein the feedback comprises a visual indication that indicates how a current position of the image capture device is deviating from the planned trajectory.

18. The apparatus of claim 1, wherein the image capture device comprises a head mounted display.

19. A method for capturing images, comprising:

receiving an indication of a planned trajectory through an environment from a first position towards a second position;

determining user input indicating an image capture device in the environment;

obtaining an image from the image capture device at a third position; and transforming the image based on a difference between the third position and a corresponding position in the planned trajectory.

20. The method of claim 19, further comprising:

receiving an indication of a intended trajectory;

receiving an indication of the first position; and determining the planned trajectory through the environment based on the intended trajectory and the indication of the first position.

21. The method of claim 20, wherein the intended trajectory is based on a set of pattern trajectories.

22. The method of claim 21, further comprising receiving a selected pattern trajectory from the set of pattern trajectories, wherein the intended trajectory is based on the selected pattern trajectory.

23. The method of claim 20, further comprising:

receiving an indication of a selected object in the environment; and determining a distance to the selected object, and wherein the planned trajectory is further determined based on the determined distance to the selected object.

24. The method of claim 23, wherein determining the planned trajectory includes determining the second position based on the distance to the selected object.

25. The method of claim 23, further comprising determining a size of the selected object, and wherein the planned trajectory is further determined based on the determined size of the selected object.

26. The method of claim 20, further comprising receiving an indication of a speed for moving towards the second position, and wherein the planned trajectory is further determined based on the indicated speed.

27. The method of claim 20, wherein the intended trajectory is based on a movement of the image capture device through the environment.

28. The method of claim 19, wherein transforming the image comprises:

determining a transformation based on the difference between the location of the image capture device and the planned trajectory when the image was obtained; and applying the transformation to the image.

29. The method of claim 19, wherein transforming the image comprises:

determining a reprojection transform based on the difference between the location of the image capture device and the planned trajectory when the image was obtained; and applying the reprojection transform to the image.

30. A non-transitory computer-readable medium having stored thereon instructions that, when executed by at least one processor, cause the at least one processor to:

receive an indication of a planned trajectory through an environment from a first position towards a second position;

determine user input indicating an image capture device in the environment;

obtain an image from the image capture device at a third position; and transform the image based on a difference between the third position and a corresponding position in the planned trajectory.

* * * * *